US012687971B2

(12) United States Patent
Yeo

(10) Patent No.: US 12,687,971 B2
(45) Date of Patent: Jul. 21, 2026

(54) INTEGRATED CIRCUIT DEVICE

(71) Applicant: HYUNDAI MOBIS CO., LTD., Seoul (KR)

(72) Inventor: Yeong Geun Yeo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/797,877

(22) Filed: Aug. 8, 2024

(65) Prior Publication Data

US 2025/0068339 A1      Feb. 27, 2025

(30) Foreign Application Priority Data

Aug. 23, 2023      (KR) ......................... 10-2023-0110453

(51) Int. Cl.
G06F 3/06                (2006.01)
(52) U.S. Cl.
CPC .......... G06F 3/0625 (2013.01); G06F 3/0634 (2013.01); G06F 3/0673 (2013.01)
(58) Field of Classification Search
CPC ........ G06F 3/06; G06F 3/0625; G06F 3/0634; G06F 3/0673; G06F 1/3234; G06F 1/3275; G06F 1/3287; G06F 1/266; G06F 1/3228; G11C 7/20; G11C 2207/2227; Y02D 10/00
See application file for complete search history.

(56) References Cited

U.S. PATENT DOCUMENTS

| | | | | |
|---|---|---|---|---|
| 5,878,264 A | * | 3/1999 | Ebrahim ............... | G06F 1/3203 |
| | | | | 713/323 |
| 6,272,645 B1 | * | 8/2001 | Wang .................... | G06F 1/3215 |
| | | | | 713/323 |
| 6,360,327 B1 | * | 3/2002 | Hobson ................. | G06F 1/3203 |
| | | | | 713/320 |
| 6,571,333 B1 | * | 5/2003 | Jain ....................... | G06F 1/3237 |
| | | | | 713/1 |

(Continued)

FOREIGN PATENT DOCUMENTS

| | | |
|---|---|---|
| CN | 114035854 A | 2/2022 |
| JP | 2011022750 A | 2/2011 |

(Continued)

OTHER PUBLICATIONS

X. Pan and R. Teodorescu, "NVSleep: Using non-volatile memory to enable fast sleep/wakeup of idle cores," 2014 IEEE 32nd International Conference on Computer Design (ICCD), Seoul, Korea (South), 2014, pp. 400-407.*

(Continued)

*Primary Examiner* — Pierre Michel Bataille
(74) *Attorney, Agent, or Firm* — Morgan, Lewis & Bockius LLP

(57)              ABSTRACT
Provided is an integrated circuit device including a memory storing trim data therein, a sleep register inputting the trim data to a sleep function block, a normal register inputting the trim data to a normal function block, a memory controller loading the trim data stored in the memory into the sleep register or the normal register, and a wake controller loading (Continued)

the trim data stored in the normal register into the sleep register via the memory controller upon first self-wake-up after power-up so as to allow the memory to be loaded first-time only after the power-up.

7 Claims, 7 Drawing Sheets

(56) References Cited

U.S. PATENT DOCUMENTS

| | | | | | |
|---|---|---|---|---|---|
| 8,060,767 | B1 * | 11/2011 | Wright | .................... | H02M 1/08 |
| | | | | | 713/323 |
| 11,442,524 | B1 * | 9/2022 | Polisi | ....................... | H03B 5/02 |
| 2006/0020765 | A1 | 1/2006 | Mahrla et al. | | |
| 2007/0028080 | A1 * | 2/2007 | Hobson | ................. | G06F 13/385 |
| | | | | | 713/1 |
| 2008/0098246 | A1 * | 4/2008 | Kim | ....................... | G06F 1/3203 |
| | | | | | 713/323 |
| 2009/0276646 | A1 * | 11/2009 | Woo | ...................... | H04W 76/27 |
| | | | | | 709/225 |
| 2012/0166822 | A1 * | 6/2012 | Kam | ....................... | G11C 5/147 |
| | | | | | 713/300 |
| 2017/0177256 | A1 | 6/2017 | Tripathi et al. | | |
| 2017/0201697 | A1 * | 7/2017 | Niitsuma | .......... | H04N 1/00885 |
| 2020/0019326 | A1 | 1/2020 | Kurokawa | | |
| 2023/0115936 | A1 * | 4/2023 | Polisi | .................... | H05B 45/30 |
| | | | | | 327/199 |

FOREIGN PATENT DOCUMENTS

| | | |
|---|---|---|
| JP | 2017123569 A | 7/2017 |
| JP | 2017142686 A | 8/2017 |
| KR | 10-2018-0057230 A | 5/2018 |

OTHER PUBLICATIONS

M. Lombardo, J. Camarero, J. Valverde, J. Portilla, E. de la Torre and T. Riesgo, "Power management techniques in an FPGA-based WSN node for high performance applications," 7th International Workshop on Reconfigurable and Communication-Centric Systems-on-Chip (ReCoSoC), York, UK, 2012, pp. 1-8.*
M. Popa and T. Slavici, "Embedded server with Wake on LAN function," IEEE EUROCON 2009, St. Petersburg, Russia, 2009, pp. 365-370. (Year: 2009).*
T.-K. Chien et al., "Low-Power MCU With Embedded ReRAM Buffers as Sensor Hub for IoT Applications," in IEEE Journal on Emerging and Selected Topics in Circuits and Systems, vol. 6, No. 2, pp. 247-257, Jun. 2016. (Year: 2016).*
Office Action issued on May 7, 2025 in the corresponding Japanese Patent Application No. 2024-096704 Note: US 2017/0177256 A1 cited therein is already of record. Note: US 2020/0019326 A1 cited therein is already of record. Note: US 2006/0020765 A1 cited therein is already of record.
Extended European Search Report issued on Nov. 22, 2024 in the corresponding European Patent Application No. 24181633.9.

* cited by examiner

INTEGRATED CIRCUIT DEVICE

CROSS-REFERENCE TO RELATED APPLICATION

This application claims priority from and the benefit of Korean Patent Application No. 10-2023-0110453, filed on Aug. 23, 2023, which is hereby incorporated by reference for all purposes as if set forth herein.

BACKGROUND

Field

Exemplary embodiments of the present disclosure relate to an integrated circuit device.

Discussion of the Background

Typically, integrated circuits that diagnose and manage the battery status are powered-on by a battery.

The large battery current consumption of these integrated circuits may affect the lifetime and performance of the battery.

To minimize this impact, the integrated circuits use a low-power mode (sleep mode) and switch to a high-power mode (normal mode) only if needed.

However, the integrated circuits perform a memory loading operation whenever the power mode switches from the low-power mode to the high-power mode.

This resulted in increased battery current consumption, which may reduce battery lifetime, increased time required for mode switching, and the risk of mode switching failing.

The background technology of the present disclosure is disclosed in Unexamined Korean Patent Publication No. 10-2018-0057230 (published on May 30, 2018) entitled 'Battery Diagnosis Device and Method'

SUMMARY

Various embodiments are directed to an integrated circuit device capable of reducing the amount of current used in memory loading by performing a memory loading operation to be performed upon power mode switching from a low-power mode to a high-power mode, first-time only when powered up.

In an aspect, the present disclosure provides an integrated circuit device including: a memory storing trim data therein; a sleep register inputting the trim data to a sleep function block; a normal register inputting the trim data to a normal function block; a memory controller loading the trim data stored in the memory into the sleep register or the normal register; and a wake controller loading the trim data stored in the normal register into the sleep register via the memory controller upon first self-wake-up after power-up, so that the memory is loaded first-time only after the power-up.

The wake controller may be configured to, upon receipt of a stabilization completion signal from the sleep function block upon power-up, power up the memory, the memory controller, the normal register, and the normal function block.

The memory controller may be configured to load the trim data into the sleep register and the normal register, and load the trim data stored in the normal register into the sleep register prior to entering a low-power mode.

The memory may be configured to retain the trim data even upon power-off.

The memory controller may be configured to, upon external wake-up after self-wake-up, load the trim data stored in the sleep register into the normal register.

The sleep register may be configured to retain the trim data during the supply of always-on power.

The normal register may be configured to retain the trim data during the supply of always-on power and normal power.

The integrated circuit device according to one aspect of the present disclosure performs the memory loading operation to be performed during switching from the low-power mode to the high-power mode, first-time only upon power-up, thereby reducing the amount of current used for the memory loading in the low-power mode.

The integrated circuit device according to another aspect of the present disclosure shortens the time of switching to the high-power mode, thereby enabling a quick response to a fault situation.

The integrated circuit device according to a still another aspect of the disclosure pre-applies the trim data to the function block, thereby increasing wake-up robustness.

BRIEF DESCRIPTION OF THE DRAWINGS

FIG. 3 is a diagram illustrating a self-wake-up sequence of an integrated circuit device according to an embodiment of the present disclosure;

FIG. 4 is a diagram illustrating an external wake-up sequence of an integrated circuit device according to an embodiment of the present disclosure;

FIG. 6 is a diagram illustrating an example of reducing a high-power mode switching time according to an embodiment of the present disclosure.

DETAILED DESCRIPTION OF THE ILLUSTRATED EMBODIMENTS

Figure 1:
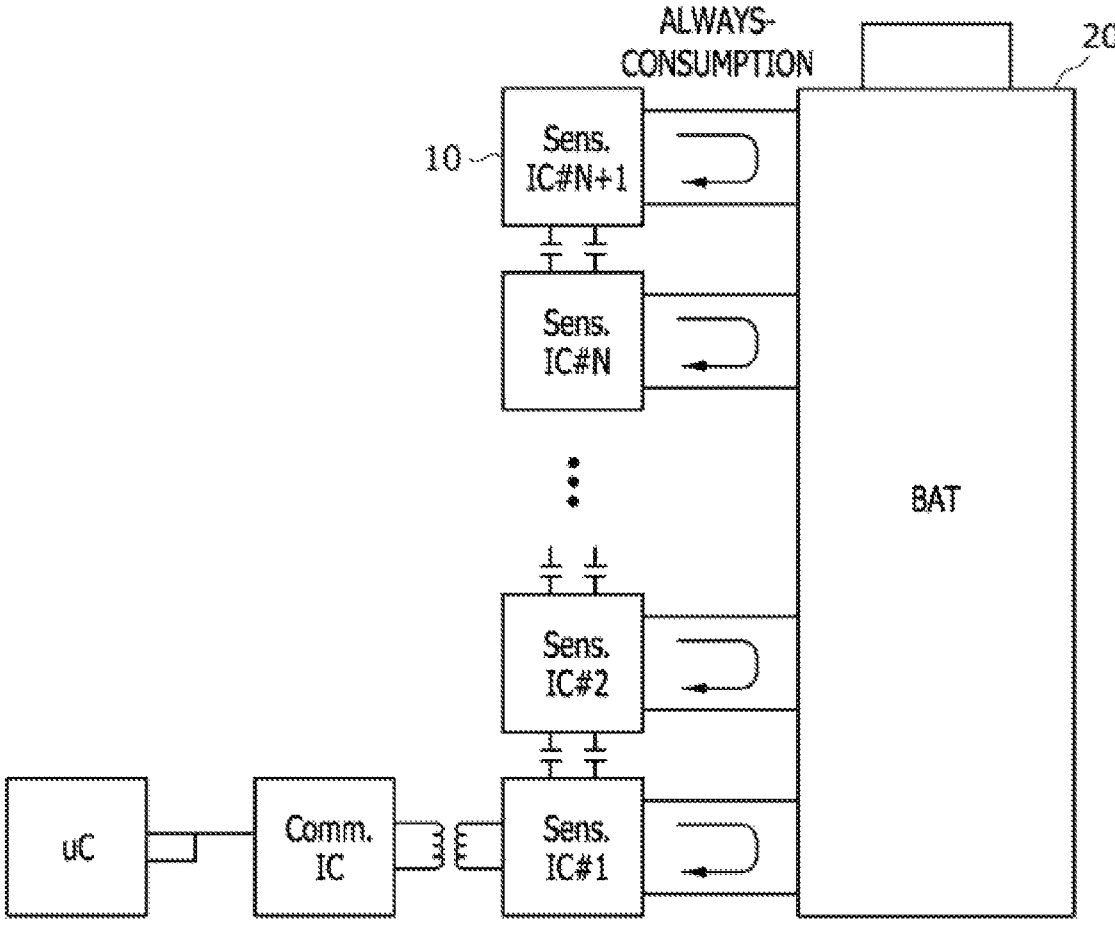
FIG. 1 is a diagram illustrating a system configuration in which an integrated circuit device according to an embodiment of the present disclosure may be applied.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an integrated circuit device according to embodiments of the present disclosure will be described with reference to the accompanying drawings. In the description, the thicknesses of the lines or the sizes of the components illustrated in the drawings may be exaggerated for clarity and convenience of explanation. In addition, the terms to be described later are terms defined in consideration of functions in the present disclosure, which may vary depending on the intention of a user or an operator, or a usual practice in the art. Therefore, definitions of these terms should be made based on the entire contents of this specification.

FIG. 1 is a diagram illustrating a system configuration in which an integrated circuit device according to an embodiment of the present disclosure may be applied.

Referring to FIG. 1, a plurality of ICs 10 may be connected to a battery 20 to diagnose a condition of the battery 20.

Each of the plurality of ICs 10 always consumes current from the battery 20.

To reduce the current consumption from the battery, the ICs 10 switch from a low-power mode (Sleep mode) to a high-power mode (Normal mode) only if needed.

The ICs 10 perform a memory loading operation upon every switching from the low-power mode to the high-power mode, which consumes a large amount of current.

Therefore, it is necessary to reduce the current consumption by limiting the memory loading operation.

The integrated circuit device according to an embodiment of the present disclosure performs the memory loading operation, which is to be performed upon switching from the low-power mode to the high-power mode after first power-up, first-time only upon the power-up.

Figure 2:
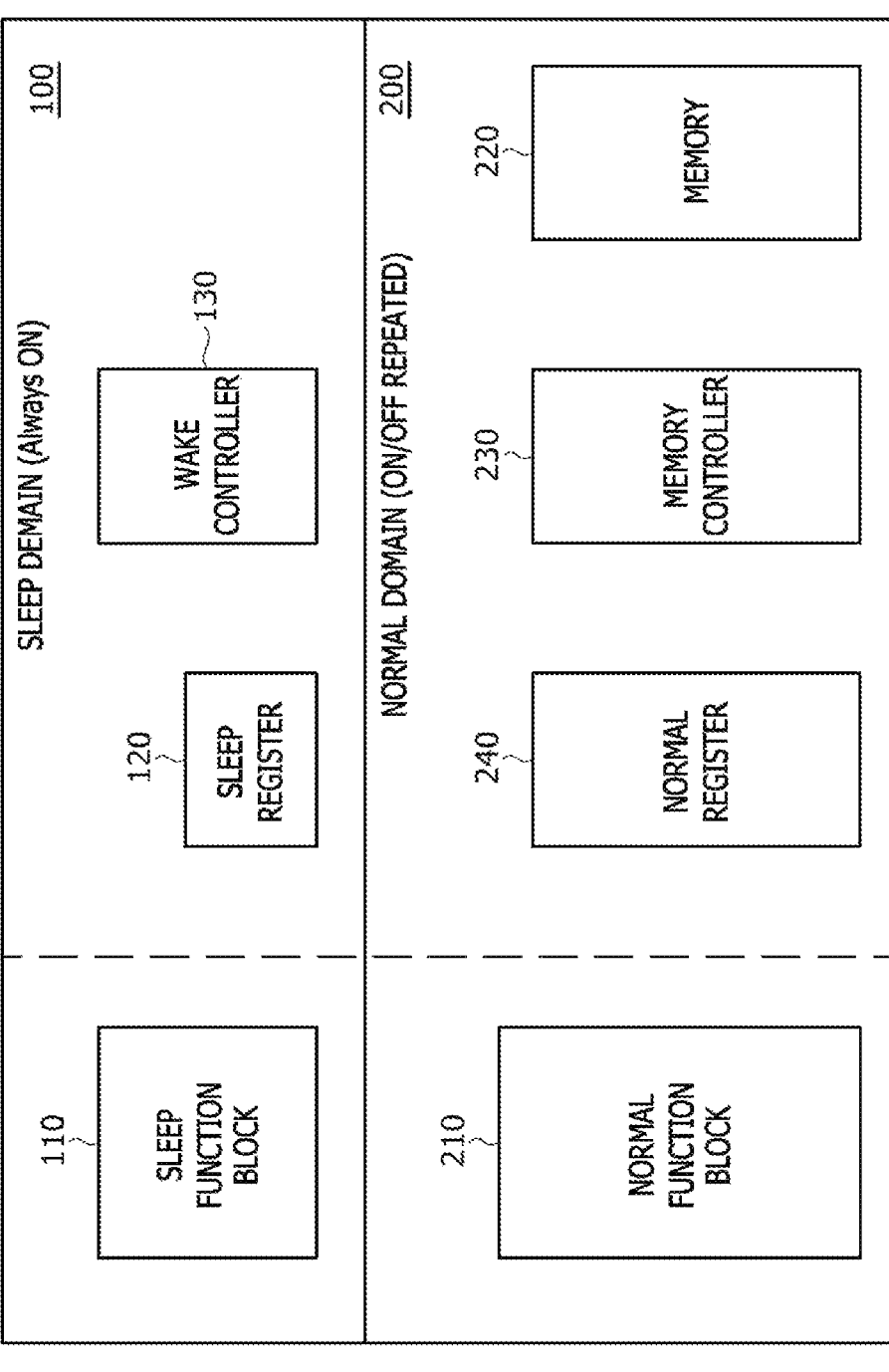
FIG. 2 is a block diagram illustrating an integrated circuit device according to an embodiment of the present disclosure.
Figure 3:
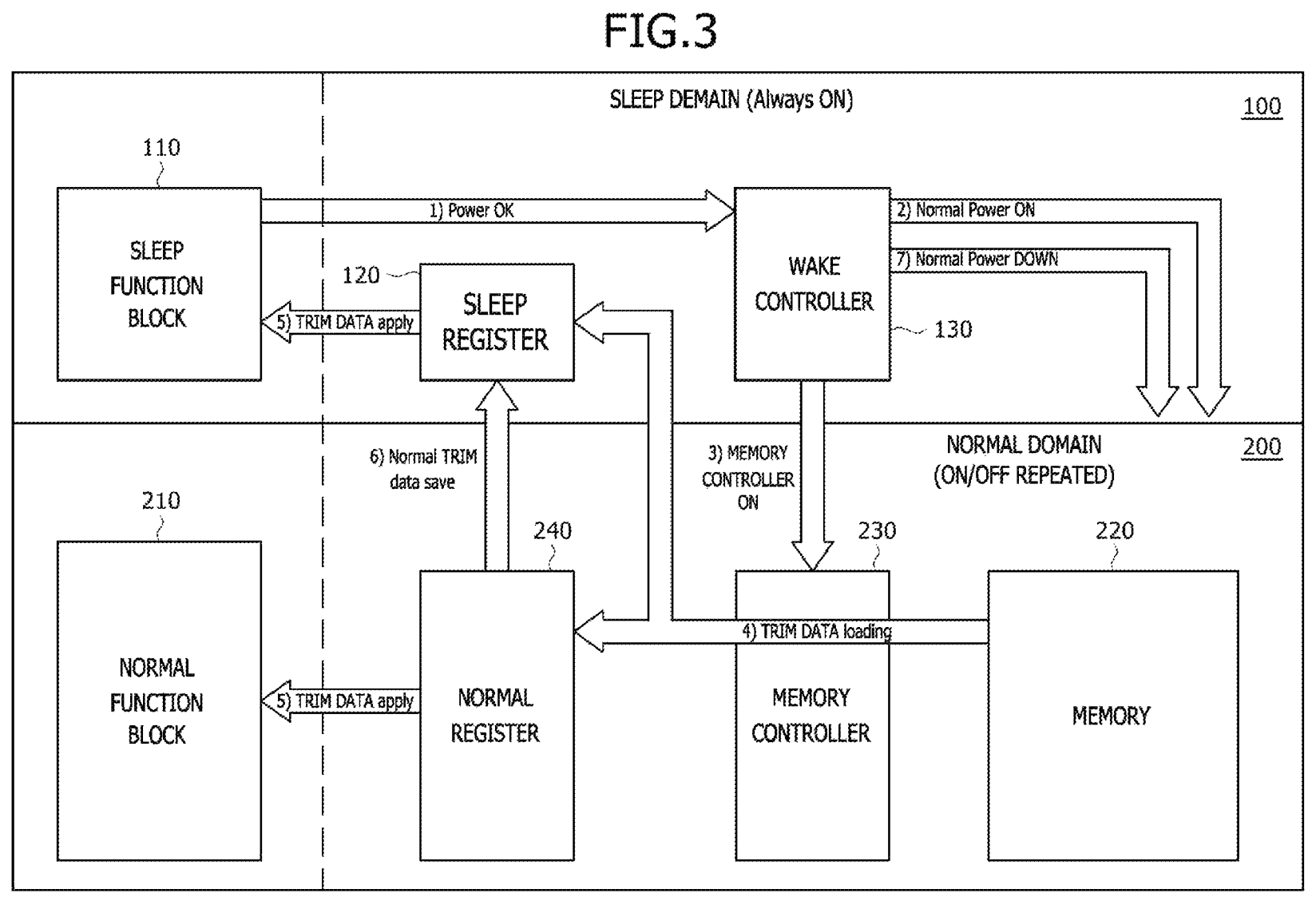
Figure 4:
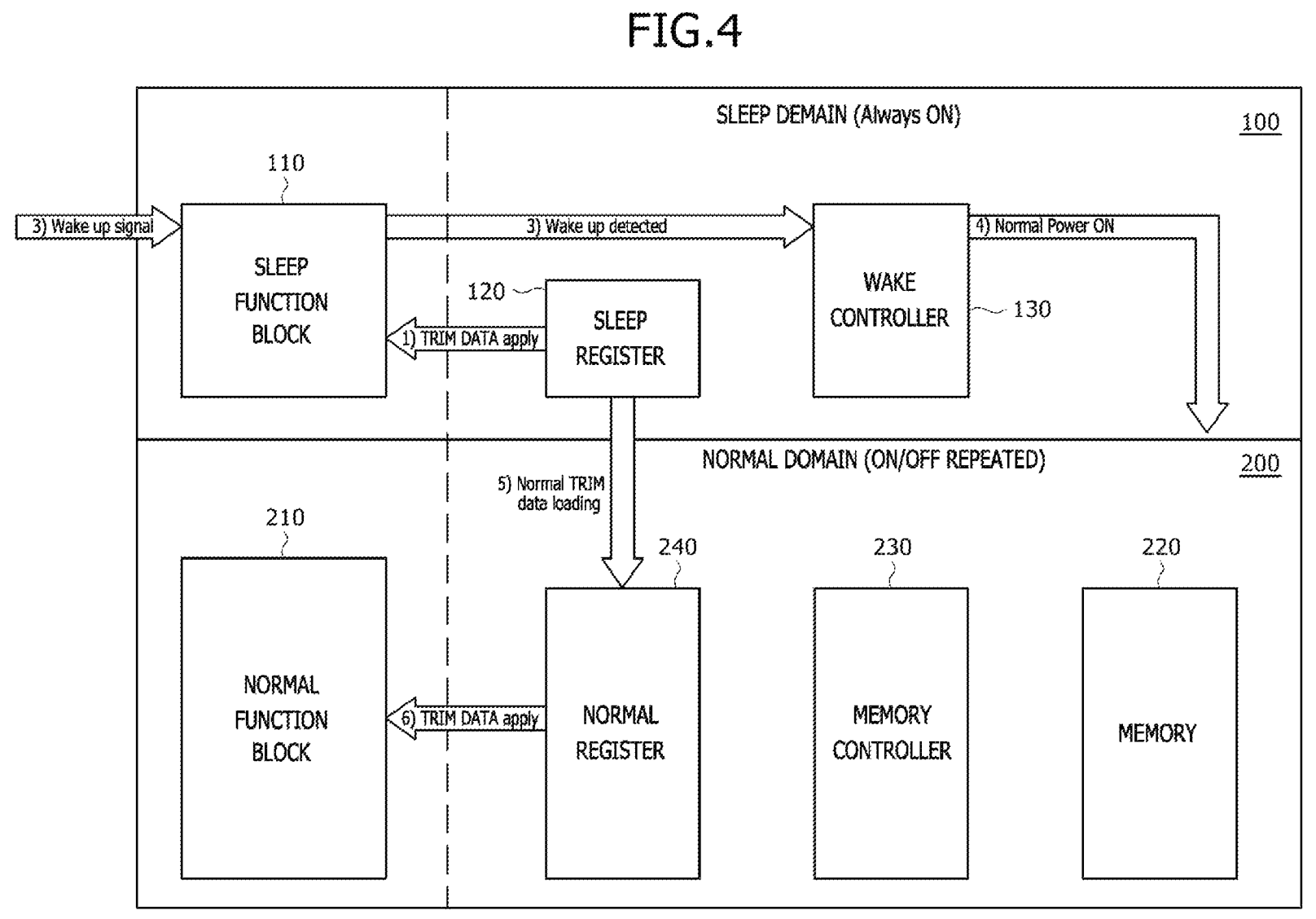
Figure 5:
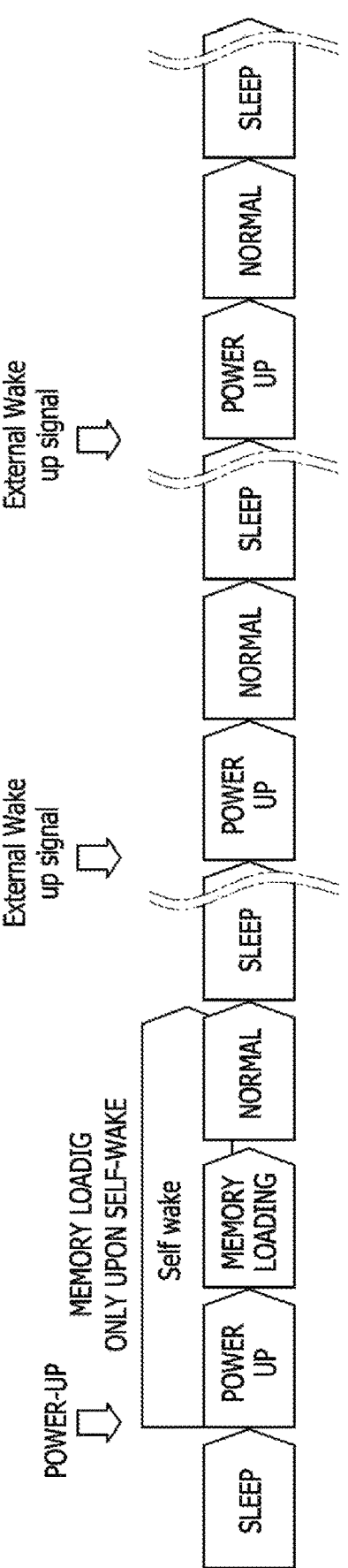
FIG. 5 is a diagram illustrating a memory loading sequence according to an embodiment of the present disclosure.
Figure 6:
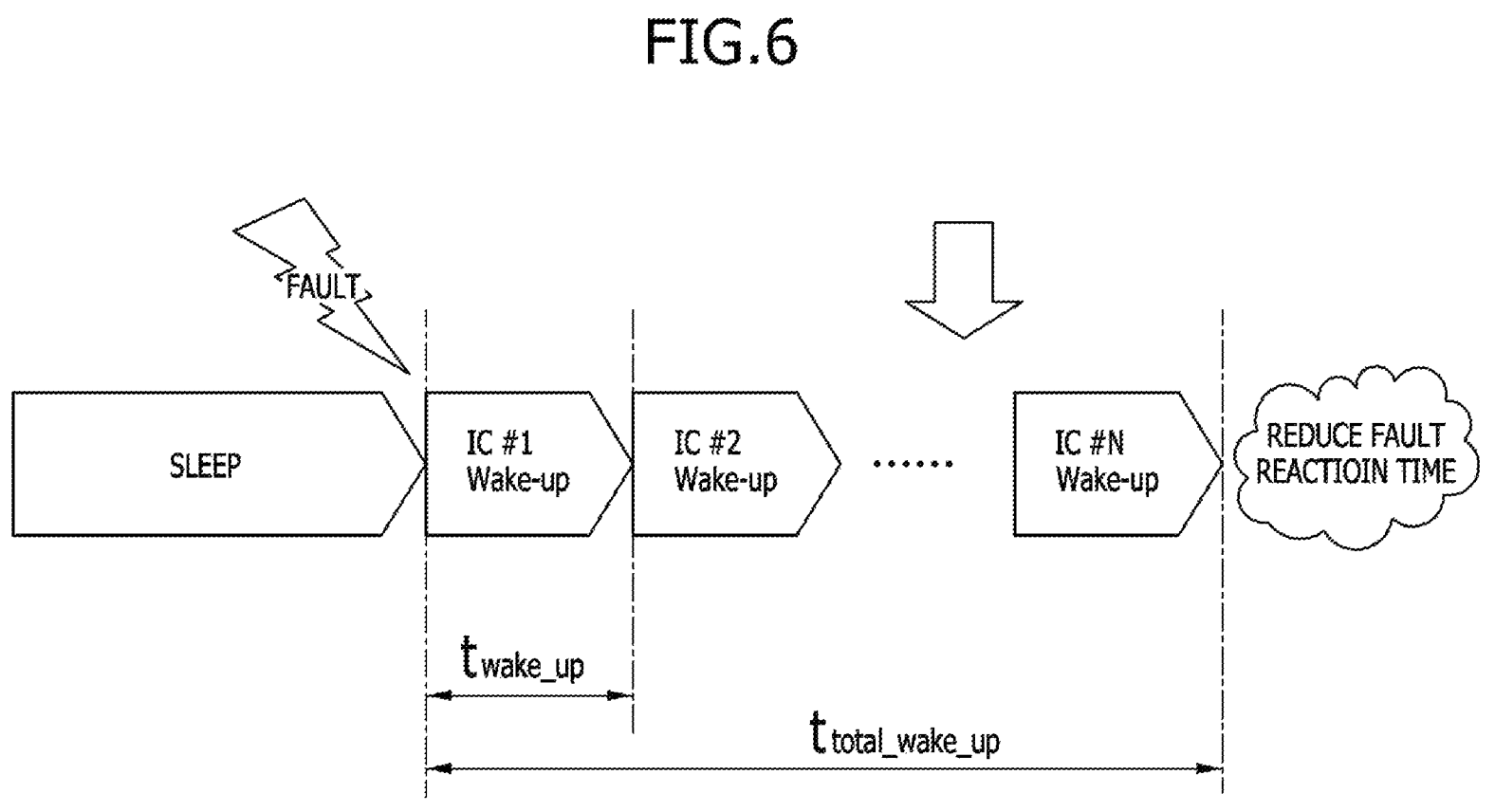
Figure 7:
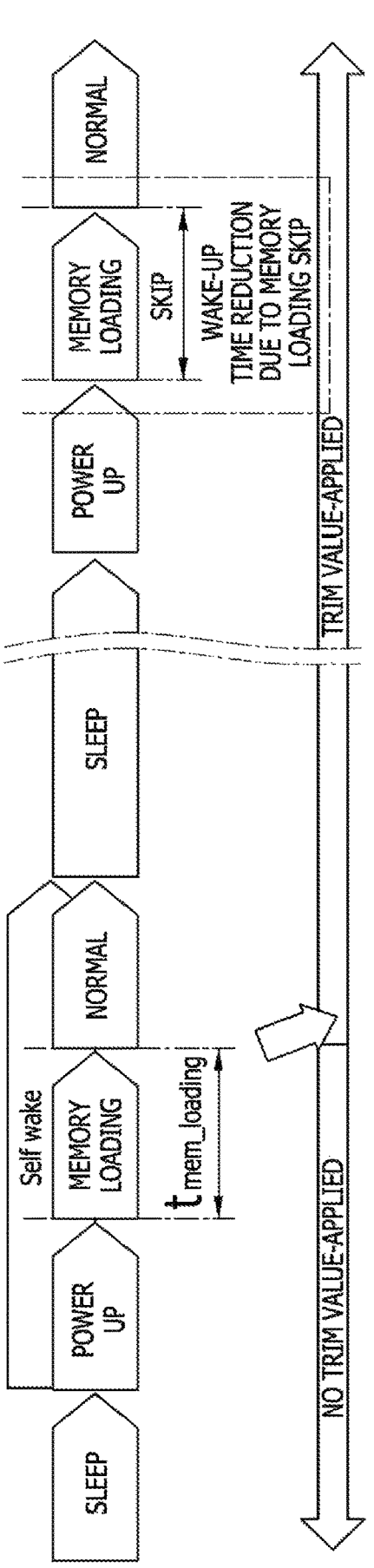
FIG. 7 is a diagram illustrating an example of pre-applying trim data according to an embodiment of the present disclosure.

FIG. 2 is a block diagram illustrating an integrated circuit device according to an embodiment of the present disclosure, FIG. 3 is a diagram illustrating a self-wake-up sequence of an integrated circuit device according to an embodiment of the present disclosure, FIG. 4 is a diagram illustrating an external wake-up sequence of an integrated circuit device according to an embodiment of the present disclosure, FIG. 5 is a diagram illustrating a memory loading sequence according to an embodiment of the present disclosure, FIG. 6 is a diagram illustrating an example of reducing a high-power mode switching time according to an embodiment of the present disclosure, and FIG. 7 is a diagram illustrating an example of pre-applying trim data according to an embodiment of the present disclosure.

Referring to FIG. 2, the integrated circuit device according to an embodiment of the present disclosure includes a sleep function block (sleep intellectual properties (IPs)) 110, a sleep register 120, a wake controller 130, a normal function block 210, a memory 220, a memory controller 230, and a normal register 240.

The sleep function block 110, the sleep register 120, and the wake controller 130 operate in a sleep domain 100 that is always on.

The wake controller 130, the normal function block 210, the memory 220, the memory controller 230, and the normal register 240 operate in a normal domain 200 that cycles on and off.

The sleep function block 110 may be an analog function block that operates in a sleep mode.

The sleep function block 110 may operate with trim data stored in the sleep register 120.

The trim data may be clock frequency or current information for a corresponding function block to achieve maximum performance within a power range according to its specifications.

The sleep function block 110 may recognize a wake-up signal.

The sleep function block 110 may communicate a stabilization complete signal (Power OK) from the wake controller 130 during the first self-wake-up sequence after power-up.

The normal function block 210 may be an analog function block that operates in normal mode.

The normal function block 210 may operate with trim data stored in the normal register 240.

The sleep register 120 may be always powered on to retain the trim data.

The sleep register 120 may input the trim data to the sleep function block 110, allowing the sleep function block 110 to be applied with the trim data in the sleep register 120.

The sleep register 120 may receive the trim data from the normal register 240 and store the trim data therein in response to a control command from the memory controller 230 prior to entering the low-power mode upon self-wake-up.

The sleep register 120 may load the trim data into the normal register 240 in response to a control command from the memory controller 230 upon external wake-up.

The wake controller 130 may receive a stabilization complete signal from the sleep function block 110 when powered up.

Upon receiving the stabilization complete signal, the wake controller 130 may power up the normal power of the normal domain 200. That is, the wake controller 130 may power up the memory 220, the memory controller 230, the normal register 240, and the normal function block 210.

The wake controller 130 causes the memory loading operation to be performed first-time only upon power-up.

That is, on the first self-wake-up after power-up, the wake controller 130 loads the trim data stored in the normal register 240 via the memory controller 230 into the sleep register 120 prior to entering the low-power mode.

Further, upon external wake-up after self-wake-up, the wake controller 130 loads the trim data stored in the sleep register 120 via the memory controller 230 into the normal register 240.

In other words, as illustrated in FIG. 5, by performing the memory loading operation first-time only upon the first self-wake-up after power-up, rather than performing the memory loading operation upon every switching from a low-power mode to a high-power mode in response to an external wake-up signal, current consumption may be greatly reduced.

The memory 220 may store trim data therein.

The memory 220 may communicate the trim data to the normal register 240 in response to a control command from the memory controller 230.

The memory 220 retains the trim data even upon power-off.

The normal register 240 may store the trim data therein.

The normal register 240 may retain the trim data during the supply of always-on power and normal power.

The normal register 240 may input the trim data to the normal function block, thereby allowing the normal function block to be applied with the trim data in the normal register 240.

The normal register 240 may load the trim data into the sleep register 120 in response to a control command from the memory controller 230 prior to entering a low-power mode upon self-wake-up.

The normal register 240 may receive the trim data from the normal register 240 and store the trim data therein in response to a control command from the memory controller 230 upon external wake-up.

Upon self-wake-up, the normal register 240 may load the trim data stored in the memory 220 into the sleep register 120 and the normal register 240.

Once the trim data is loaded into the sleep register 120, the sleep function block 110 may be applied with the trim data stored in the sleep register 120 from this point of time.

Once the trim data is loaded into the normal register 240, the normal function block 210 may be applied with the trim data stored in the normal register 240 from this point of time.

Subsequently, prior to entering a low-power mode, the memory controller 230 stores the trim data stored in the normal register 240 in the sleep register 120. Accordingly, since the sleep register 120 retains the trim data, even upon entering the low-power mode from the high-power mode, the sleep function block 110 retains the trim data stored in the sleep register 120 being applied. On the other hand, the normal function block 210 retains no trim data applied because the normal function block is not powered-up.

According to an exemplary embodiment of the present disclosure, the sleep function block 110 and the normal function block 210 may include a processor (e.g., computer, microprocessor, CPU, ASIC, circuitry, logic circuits, etc.) and an associated non-transitory memory storing software instructions which, when executed by the processor, provides the functionalities of the sleep function block 110 and the normal function block 210. Herein, the memory and the processor may be implemented as separate semiconductor circuits. Alternatively, the memory and the processor may be implemented as a single integrated semiconductor circuit. The processor may embody one or more processor(s).

This will be described in detail with reference to FIGS. 3 and 4.

Referring to FIG. 3, upon self-wake-up after power-up, the sleep function block 110 communicates a stabilization complete signal to the wake controller 130.

Upon receiving the stabilization complete signal from the sleep function block 110, the wake controller 130 powers up the normal domain 200. Accordingly, the normal function block 210, the normal register 240, the memory controller 230, and the memory 220 are powered up.

As the normal power is powered up, the wake controller 130 activates the operation of the memory controller 230.

The memory controller 230 loads the trim data stored in the memory 220 into the sleep register 120 and the normal register 240.

Once the trim data is loaded into the sleep register 120, the sleep function block 110 may be applied with the trim data stored in the sleep register 120 from this point of time.

Once the trim data is loaded into the normal register 240, the normal function block 210 may be applied with the trim data stored in the normal register 240 from this point of time.

Subsequently, prior to entering a low-power mode, the memory controller 230 loads the trim data stored in the normal register 240 into the sleep register 120. In this case, since the sleep register 120 retains the trim data, even upon entering the low-power mode from the high-power mode, the sleep function block 110 retains the trim data stored in the sleep register 120 being applied. In contrast, the normal function block 210 retains no trim data being applied because the normal function block is not powered-up.

Referring to FIG. 4, upon external wake-up after self-wake-up, the sleep function block 110 has already been applied with the trim data in the sleep register 120 by the self-wake-up.

Upon receiving a wake-up signal, the sleep function block 110 communicates wake-up signal receipt information to the wake controller 130.

The wake controller 130 powers up the normal domain 200. Accordingly, the normal function block 210, the normal register 240, the memory controller 230, and the memory 220 are powered up.

As the normal power is powered up, the memory controller 230 loads the trim data stored in the sleep register 120 into the normal register 240. Accordingly, the normal function block 210 is applied with the trim data stored in the normal register 240.

In other words, as illustrated in FIG. 5, the memory controller 230 may load the trim data stored in the normal register 240 into the sleep register 120 upon self-wake-up, prior to entering the low-power mode, and then upload the trim data from the sleep register 120 into the normal register 240 upon external wake-up to allow the memory loading to be performed first-time only after power-up, thereby reducing the amount of current used for the memory loading in the low-power mode.

Further, as illustrated in FIG. 6, the memory loading time of each IC 10 connected to the battery 20 may be reduced, thereby reducing the memory loading time of the number of ICs 10, which reduces the fault reaction time.

For example, if the time required to load a 2 k-bit memory is about 1 ms, and 20 ICs 10 are mounted, a total memory loading time of 20 ms may be reduced.

Furthermore, as illustrated in FIG. 7, wake-up robustness may be improved by applying trim data in advance.

For example, if a 100 kHz oscillator that recognizes a wake-up pulse frequency is out of a frequency range, the oscillator may not wake up. However, the present embodiment may overcome the non-wake-up problem by preloading the trim data into the sleep register 120.

While the present disclosure has been described with reference to the embodiments illustrated in the drawings, these embodiments are exemplary only, and one of ordinary skill in the art will understand that various modifications and other equivalent embodiments are possible therefrom. Accordingly, the scope of technical protection of the present disclosure is to be defined by the following claims.

What is claimed is:

1. An integrated circuit device comprising:

a memory configured to store trim data therein;

a sleep register disposed in an always-on power domain and configured to input the trim data to a sleep function block;

a normal register disposed in a normal-power domain and configured to input the trim data to a normal function block;

a memory controller configured to load the trim data stored in the memory into the sleep register or the normal register; and a wake controller configured to load the trim data stored in the normal register into the sleep register via the memory controller upon first self-wake-up after power-up so as to allow the memory to be loaded first-time only after the power-up, wherein after the first self-wake-up, the wake controller is disabled from loading trim data from the normal register to the sleep register, wherein the sleep register and the normal register are physically distinct registers.

2. The integrated circuit device of claim 1, wherein the wake controller is configured to, upon receipt of a stabilization completion signal from the sleep function block upon power-up, power up the memory, the memory controller, the normal register, and the normal function block.

3. The integrated circuit device of claim 1, wherein the memory controller is configured to load the trim data into the sleep register and the normal register, and load the trim data stored in the normal register into the sleep register prior to entering a low-power mode.

4. The integrated circuit device of claim 1, wherein the memory is configured to retain the trim data even upon power-off.

5. The integrated circuit device of claim 1, wherein the memory controller is configured to, upon external wake-up after self-wake-up, load the trim data stored in the sleep register into the normal register.

6. The integrated circuit device of claim 1, wherein the sleep register is configured to retain the trim data during the supply of always-on power.

7. The integrated circuit device of claim 1, wherein the normal register is configured to retain the trim data during the supply of always-on power and normal power.

* * * * *